United States Patent
Hartmann et al.

(12)

(10) Patent No.: US 6,377,955 B1
(45) Date of Patent: Apr. 23, 2002

(54) METHOD AND APPARATUS FOR GENERATING USER-SPECIFIED REPORTS FROM RADIUS INFORMATION

(75) Inventors: Charles L. Hartmann, Newport Beach, CA (US); Glenwood Ray Clark, Redmond, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/281,754

(22) Filed: Mar. 30, 1999

(51) Int. Cl.[7] ............................................. G06F 17/30

(52) U.S. Cl. ............................ 707/104; 707/9; 707/10; 707/4; 709/225; 709/229

(58) Field of Search ..................... 707/10, 9, 4, 104; 709/225, 229, 217, 203

(56) References Cited

U.S. PATENT DOCUMENTS

| | | | | | |
|---|---|---|---|---|---|
| 5,889,958 | A | * | 3/1999 | Willens | 395/200.59 |
| 6,070,243 | A | * | 5/2000 | See et al. | 713/201 |
| 6,097,719 | A | * | 8/2000 | Benash et al. | 370/352 |
| 6,151,628 | A | * | 11/2000 | Xu et al. | 709/225 |
| 6,189,096 | B1 | * | 2/2001 | Haverty | 713/155 |
| 6,205,479 | B1 | * | 3/2001 | Dulai et al. | 709/225 |
| 6,212,561 | B1 | * | 4/2001 | Sitaraman et al. | 709/225 |
| 6,233,616 | B1 | * | 5/2001 | Reid | 709/225 |
| 6,243,749 | B1 | * | 6/2001 | Sitaraman et al. | 709/223 |

OTHER PUBLICATIONS

The RADIUS Page, http://www.dnt.ro/~vsv/radius.html, printed Mar. 3, 1999.

C. Rigney, et al., "Remote Authentication Dial In User Services (RADIUS)", Request for Comments RFC #2138, http://www.dnt.ro/%7Evsv/rfc2138.txt, Apr. 1997.

C. Rigney, et al., "RADIUS Accounting", Request for Comments (RFC) #2139, http://www.dnt.ro/%7Evsv/rfc2139.txt, Apr. 1997.

B. Full, et al., "Radius Remote Authentication Dial In User Service", http://www.squashduck.com/~roundman/radius/, printed Apr. 2, 1999.

* cited by examiner

Primary Examiner—Jean M. Corrielus
(74) Attorney, Agent, or Firm—Hickman Palermo Truong & Becker LLP

(57) ABSTRACT

A method and apparatus are provided for generating a report that summarizes performance of a network based on actual network performance data formatted according to the RADIUS protocol. A network access server generates and stores RADIUS accounting information. An archiver, operating under the control of archive configuration control information, and stores it in archive data. A report generator reads the archive data, under control of report configuration control information, and generates a report. The report configuration control information specifies a report type (accumulate values, count values, or determine a maximum value); one or more categories of RADIUS attributes that are to be accumulated, counted, or otherwise reported; and a title and related information. Thus, a user of a network management system may define custom reports by modifying the report configuration control information, thereby reducing the need for custom report programming, reducing engineering time and project management time, and reducing concomitant costs.

25 Claims, 14 Drawing Sheets

Fig. 3

RADIUS ACCOUNTING DATA 300

306 → Tue Sep 1 10:07:13 1998
    NAS - IP - Address = 10.1.0.15
    NAS - Port = 4
    NAS - Port - Type = Async
    User-Name = "dan2@ISP1"
    Called-Station-Id = "2015305000"
    Acct-Status-Type = Start
    Acct-Authentic = Local
    User-Service-Type = Framed-User
    Acct-Session-Id = "00000115"
    Framed-Protocol = 19877077230
    Acct-Delay-Time = 0
} 302

308 → Tue Sep 1 10:07:17 1998
    NAS - IP - Address = 10.1.0.15
    NAS - Port = 4
    NAS - Port - Type = Async
    User-Name = "dan2@ISP1"
    Called-Station-Id = "2015305000"
    Acct-Status-Type = Stop
    Acct-Authentic = Local
    User-Service-Type = Framed-User
    Acct-Session-Id = "00000115"
    Framed-Protocol = 19877077230
    Terminate-Cause = Modem-Loss-Carrier
    Pre-Input-Octets = 29835
    Pre-Output-Octets = 34073
    Pre-Input-Packets = 455
    Pre-Output-Packets = 409
    Acct-Input-Octets = 52
    Acct-Output-Octets = 46
    Acct-Input-Packets = 3
    Acct-Output-Packets = 3
    PreSession-Time = 8
    Acct-Session-Time = 4
    Data-Rate = 0
    Acct-Delay-Time = 0
} 304

FIG. 6A

MAXIMUM SESSIONS EXCEEDED REPORT 600

| TIME OF DAY | MAXIMUM SESSIONS EXCEEDED |
|---|---|
| 1 AM | 1 |
| 2 AM | 5 |
| 3 AM | 10 |
| 4 AM | 0 |
| ⋮ | ⋮ |
| 9 PM | 16 |
| 10 PM | 7 |
| 11 PM | 2 |
| 12 PM | 8 |

FIG. 6C

CALL DURATION 620

| TIME OF DAY | 0-5 min | 5-15 min | 15-60 min | >60 min |
|---|---|---|---|---|
| 1 AM | 1 | 4 | 0 | 2 |
| 2 AM | 5 | 1 | 7 | 0 |
| 3 AM | 3 | 6 | 8 | 4 |
| 4 AM | 2 | 4 | 2 | 0 |
| ⋮ | ⋮ | ⋮ | ⋮ | ⋮ |
| 9 PM | 4 | 7 | 6 | 0 |
| 10 PM | 8 | 9 | 2 | 0 |
| 11 PM | 10 | 6 | 2 | 1 |
| 12 PM | 4 | 11 | 9 | 5 |

CONNECT HOURS    640

642 → | ← 644

| TIME OF DAY | CONNECT TIME |
|---|---|
| 1 AM | 25 |
| 2 AM | 36 |
| 3 AM | 58 |
| 4 AM | 75 |
| ⋮ | ⋮ |
| 9 PM | 2024 |
| 10 PM | 2116 |
| 11 PM | 2328 |
| 12 PM | 3046 |

FIG. 6E

DISCONNECT REASON 650

| TIME OF DAY | LOCAL HOST DISCONNECT | CARRIER LOST | CD TIMER EXPIRED | UNKNOWN |
|---|---|---|---|---|
| 1 AM | 1 | 0 | 0 | 2 |
| 2 AM | 0 | 0 | 1 | 1 |
| 3 AM | 0 | 0 | 2 | 0 |
| 4 AM | 1 | 2 | 1 | 0 |
| ⋮ | ⋮ | ⋮ | ⋮ | ⋮ |
| 9 PM | 0 | 1 | 0 | 2 |
| 10 PM | 1 | 4 | 3 | 0 |
| 11 PM | 6 | 0 | 1 | 3 |
| 12 PM | 1 | 8 | 4 | 1 |

Columns: 652, 654, 656, 658, 660

FIG. 6F

CONNECTION SPEED 670

672    674    676    678    680

| TIME OF DAY | 2800 | 5600 | 9800 | 19200 |
|---|---|---|---|---|
| 1 AM | 2 | 1 | 2 | 5 |
| 2 AM | 1 | 0 | 6 | 3 |
| 3 AM | 0 | 2 | 2 | 2 |
| 4 AM | 0 | 2 | 2 | 0 |
| ⋮ | ⋮ | ⋮ | ⋮ | ⋮ |
| 9 PM | 0 | 5 | 4 | 2 |
| 10 PM | 1 | 2 | 1 | 2 |
| 11 PM | 0 | 4 | 2 | 2 |
| 12 PM | 1 | 1 | 1 | 1 |

METHOD AND APPARATUS FOR GENERATING USER-SPECIFIED REPORTS FROM RADIUS INFORMATION

FIELD OF THE INVENTION

The present invention generally relates to data processing. The invention relates more specifically to generating reports that show information relating to networks, and further relates to methods and apparatus for generating user-specified reports of network accounting information.

BACKGROUND OF THE INVENTION

A network system generally includes a number of network devices, such as switches, routers, and others, connected so as to allow communication among the devices and end station devices such as desktop machines, servers, hosts, printers, fax machines, and others. Many companies have a desire to provide remote access to their computer networks. By allowing remote access, individuals can connect to the computer network to use it to work and obtain resource information while located at a remote site.

A popular method of providing remote access to a network is through the use of a dial-in network access server (NAS) that controls access to the network. For example, the server model AS5300, commercially available from Cisco Systems Inc., can be used to provide dial-in access to a company's network. Individuals can access the network system by dialing into the network access server from a Remote Node to establish a connection. In this context, the term Remote Node refers to a client device such as a personal computer (PC) or router that can be used to dial in and establish a connection with the network access server.

Managing the dial-in connections that are made to a large number of network access servers can require significant administrative support. Not only must administrative support personnel ensure that network security is maintained, but they must also ensure that remote access to the network is properly provided to those individuals that are authorized to access the network remotely, and that appropriate response times are maintained once a connection is established. When the network access servers are part of an Internet Service Provider (ISP) or other commercial institution, accurate accounting of connection time is required so that customers may be billed correctly. These functions are generically known as authorization, authentication and accounting (AAA).

One method of managing connections to a group of network access servers is through use of a shared accounting server, such as authorization, authentication and accounting (AAA) server software component of CiscoSecure ACS, which is commercially available from Cisco Systems Inc. With a shared accounting server, connection accounting information that is associated with the dial-in connections that are established with the different network access servers can be maintained at one location. In this context, the connection accounting information represents statistical data about the connections that were made or which were attempted to be made with a group of network access servers. For standardization purposes, certain accounting protocols have been developed that define the accounting information that is to be communicated between a network access server and a shared accounting server. For example, the Remote Authentication Dial In User Service (RADIUS) Accounting protocol can be used for carrying accounting information between network access servers and a shared accounting server. The RADIUS Accounting protocol is defined in detail in such documents as Request For Comment (RFC) 2138 and RFC 2139. Existing network systems are based on standard accounting protocols such as the RADIUS Accounting protocol. In these systems, a shared accounting server typically stores the accounting information in one or more files.

FIG. 3 illustrates RADIUS accounting data 300 in a file containing two exemplary RADIUS Accounting records 302, 304 that describe connections that were made between a shared accounting server and a group of network access servers. Timestamp values 306, 308 indicate the respective creation date and time for records 302, 304. Once the RADIUS Accounting information is stored, an administrator may access the information to determine specific information about particular connection that was established with a particular network access server.

However, a drawback with storing the RADIUS Accounting information in a file, as depicted in Table 1, is that interpreting the significance of the data can be both difficult and extremely time consuming. Thus, to aid in the interpretation of the data, a mechanism may generate a report that summarizes or interprets certain information about the connections. For example, a report may indicate the number of times a particular port was used by each of the network access servers. Alternatively, a report may indicate the connection speed used for a particular connection. In another alternative, a report indicates the total number of connections that were established with the group of network access servers for a particular day.

However, a drawback with generating such reports is that different information may be important to different network administrators. For example, a particular administrator may require a report that depicts the number of connections that were established with a particular network access server, while a different administrator may require a report that depicts the connection speed that was established for each connection.

In addition, different administrators may require that the information be displayed in different formats. For example, one administrator may require that a report be generated that depicts the number of connections that were established with a network access server on a week-by-week basis. Alternatively, another administrator may require that a report be generated that depicts the number of connections that were established with a network access server on an hour-by-hour basis. Thus, each administrator may require that different types of reports be generated.

As a result, in past approaches, generating such different reports has required custom, hard-coded software that must be modified whenever a new report is created. In addition, if an administrator later determines that a new report type is required, additional software will typically be required to produce the new report type. The software that generates a particular report is typically fixed and must undergo frequent revision as the administrator requests new capabilities. Based on the foregoing, there is a clear need for a mechanism that can produce reports that contain accounting information that is desired by a particular individual.

There is also a need for a mechanism that can produce reports that contain information in the particular format that is desired by the individual.

Requests for new reports may cause projects to have larger than normal maintenance efforts. Further, requests for new reports typically are handled by the vendor of the network equipment or the vendor of the AAA server software. If the vendor has insufficient engineering resources available, further delay is caused until an engineer becomes available. Thus, there is a need for a mechanism whereby a third party, such as a customer or a value-added reseller (VAR) of the vendor's equipment or software, can create reports or modify existing reports.

SUMMARY OF THE INVENTION

The foregoing needs, and other needs and objects that will become apparent from the following description, are achieved in the present invention, which comprises, in one aspect, a method of generating a report that describes performance characteristics of a computer network based on RADIUS accounting information that is produced by the network in operation, comprising the steps of creating and storing archive data comprising a selected portion of the RADIUS accounting information; creating and storing configuration information that defines the report and comprises a report type identifier that is associated with one or more RADIUS attributes that identify data values in the archive data and that is associated with a generic report type; and one or more attribute values that specify bounds of ranges of the data values; retrieving and parsing the configuration information to create and store one or more buckets associated with the ranges of the data values for receiving data values falling within such ranges; reading the archive data and selectively storing its data values in the buckets based on the configuration information; and generating a report by displaying the values that are in the buckets.

According to one feature, creating and storing the configuration information comprises creating and storing configuration information that defines the report and comprises a report type identifier that is associated with one or more RADIUS attributes that identify data values in the archive data and that is associated with a generic report type; one or more attribute values that specify bounds of ranges of the data values; and an abbreviation of a name associated with the report; storing a label, which includes the abbreviation, in a section of the configuration information that identifies the bounds of ranges.

According to another feature, the step of generating a report comprises the step of generating a report by displaying the values that are in the buckets only when an attribute in the archive data indicates that an end of the report has been reached. Another feature is that the step of reading the archive data and selectively storing its data values further includes the step of rolling the data values in the buckets when a new time period is identified in the archive data.

According to another feature, the step of generating a report further comprises the step of creating and storing report data in the form of a matrix having rows corresponding to time periods and columns corresponding to customers, and wherein the step of reading the archive data and selectively storing its data values further includes the step of, when a new customer is identified in the archive data, creating a new column in the matrix and creating rows containing zero data from the starting time period up to the time period currently being processed.

In another feature, the step of reading the archive data and selectively storing its data values in associated buckets only when the data values are needed by the current report and its associated buckets. In still another feature, creating and storing configuration information comprises creating and storing configuration information that defines a plurality of reports, the configuration information comprising, for each of the plurality of reports: a report type identifier that is associated with one or more RADIUS attributes that identify data values in the archive data and that is associated with a generic report type; a time interval value that indicates a period of time to be covered by information in the report; and one or more category values that specify bounds of ranges of the data values. In a related feature, the configuration information includes one or more category values that specify bounds of ranges of the data values; and an abbreviation of a name associated with the report. Creating and storing the configuration information may involve a label, which includes the abbreviation, in a section of the configuration information that identifies the bounds of ranges.

According to another feature, the method further comprises the steps of receiving and storing non-RADIUS network accounting data; selectively archiving a portion of the non-RADIUS network accounting data in a non-RADIUS archive; storing a sub-portion of information from the non-RADIUS archive in the archive data, based on non-RADIUS archive configuration control information.

In another feature, creating and storing configuration information comprises creating and storing configuration information that defines a plurality of reports, the configuration information comprising, for each of the plurality of reports: a report type identifier that is associated with one or more RADIUS attributes that identify data values in the archive data and that is associated with a generic report type selected from among: a numeric value counting report type; a string value counting report type; and an accumulating report type.

The invention also encompasses a computer-readable medium, and a computer data signal embodied in a carrier wave, configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an example of connection information that may be stored by an accounting server;

FIG. 6A depicts an example of a user-specified report;

FIG. 6C depicts another example of a user-specified report;

FIG. 6D depicts another example of a user-specified report;

FIG. 6E depicts another example of a user-specified report;

FIG. 6F depicts another example of a user-specified report;

DETAILED DESCRIPTION OF THE PREFERRED EMBODIMENT

A method and apparatus for generating reports based on RADIUS accounting information from network systems is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

A method is provided in which reports of RADIUS accounting information are dynamically generated based on a set of report criteria that is submitted by a user. In particular, the method allows users to generate report data that is individually tailored to the users' specific needs.

Figure 2:
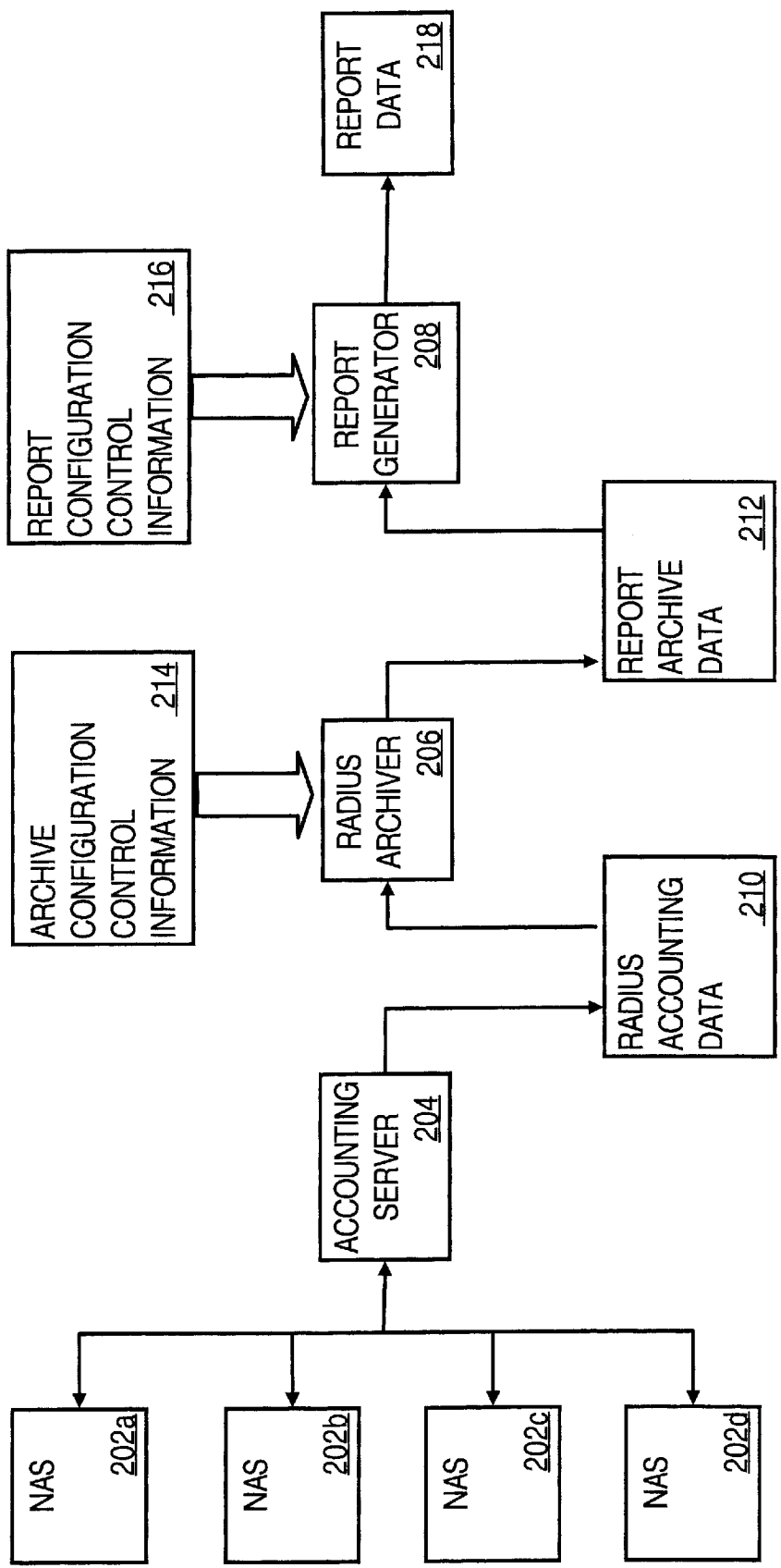
FIG. 2 is a block diagram of a system in which embodiments can be used.

FIG. 2 is a block diagram of a system 200 that includes one or more network access servers (NAS) 202a–d, an accounting server 204, a RADIUS archiver 206, a report generator 208, RADIUS accounting data 210, report archive data 212, archive configuration control information 214, report configuration control information 216 and report data 218.

Each of the network access servers 202a–d are computers, or one or more hardware or software components or processes that cooperate or execute in one or more computer systems. Each of network access servers 202a–d is configured to receive connection requests from clients that are attempting to access an associated network system. The connection requests generally represent dial-in requests that are typically made using one of the Internet's standard dial-in protocols, such as Point-to-Point Protocol (PPP) or the Serial Line Internet Protocol (SLIP). However, any type of connection may be made between a client and network access servers 202a–d.

Accounting server 204 is a computer, or one or more hardware or software components or processes that cooperate or execute in one or more computer systems. In one embodiment, accounting server 204 is an Authorization, Authentication and Accounting (AAA) server. When one of the network access servers 202a–d receives a connection request from a client, the network access server communicates with accounting server 204 to determine whether a connection should be established with the particular client. Thus, accounting server 204 is responsible for receiving connection requests from the network access servers 202a–d, determining whether the connection requests should be authorized, and for returning response messages to the network access servers 202a–d that indicate whether or not a connection should be established for the requesting client. The accounting server 204 provides an important control point that prevents over-subscription of the system and enables management to determine whether enough connections are available for actual throughput.

In addition to determining whether a particular request should be authorized, accounting server 204 maintains accounting information about the connections that are established with the network access servers 202a–d. In one embodiment, network access servers 202a–d operate as clients of the accounting server 204 and are responsible for passing connection information to the accounting server 204. This connection information is maintained by the accounting server 204 and provides a mechanism for monitoring the performance of the network system.

In a preferred embodiment, accounting server 204 communicates with network access servers 202a–d using the RADIUS Accounting protocol. In one embodiment, as RADIUS accounting information is received from the network access servers 202a–d, accounting server 204 periodically stores the information in the form of RADIUS accounting data 210. In one embodiment, RADIUS accounting data 210 is maintained in nonvolatile memory. The RADIUS accounting data 210 may be stored on the same machine as accounting server 204 or on a machine that is separate from accounting server 204. In a preferred embodiment, the accounting server 204 maintains the RADIUS accounting data 210 in a plurality of files, and each file is associated with one of the network access server 202a–d.

Archiver 206 is a computer, or one or more hardware or software components or processes that cooperate or execute in one or more computer systems. Archiver 206 is configured to read the RADIUS accounting data 210 and to store some or all of the information as report archive data 212. The RADIUS accounting data 210 may comprise a large volume of information. Accordingly, in one embodiment, archiver 206 functions as a filter to reduce the amount of information that is stored as report archive data 212. In this manner, the archiver 206 may filter out information that is not required for generating report data 218.

In one embodiment, archiver 206 stores report archive data 212 in one or more files. In a preferred embodiment, the report archive data 212 is stored in a plurality of separate files on a day-by-day basis by the RADIUS archiver 206. For example, in one embodiment, a separate file is created for storing the report archive data 212 that is generated during a particular day. The files may be maintained in a single directory, or in separate directories, in which each directory corresponds to a particular day.

In certain embodiments, a user or administrator can control the type of information that is stored in report archive data 212. For example, archive configuration control information 214 may be used by archiver 206 to control the set of RADIUS accounting data 210 that is stored in report archive data 212. How archive configuration control information 214 may used to determine and control what RADIUS accounting data 210 is stored as report archive data 212 is explained further below.

Report generator 208 is a computer, or one or more hardware or software components or processes that cooperate or execute in one or more computer systems. Report generator 208 is configured to read report archive data 212 and to dynamically generate report data 218 based on the particular needs of a user or administrator. In one embodiment, the report data 218 is maintained as a plurality of separate report files based on the particular information that is of interest to the user. In a preferred embodiment, report data 218 is stored as one or more comma-separated-value files (".csv files") to allow the information to be read or imported by other software. In another embodiment, report data 218 is stored in a database system and is accessible by a user through a database application program.

In certain embodiments, report configuration control information 216 is used by report generator 208 to determine the information that is to be stored as report data 218. How the report configuration control information 216 may be used to control the information that is stored as report data 218 is explained further below. Generally, report generator 208 is table driven, thereby providing flexibility for future reporting requirements. It accommodates reports of several generic types. The user may configure specific reports based on the generic types. The user may configure new reports involving different RADIUS accounting attributes if the new reports fall within one of the supported generic types.

STORING RADIUS ACCOUNTING DATA

In certain embodiments, network access servers 202a–d and accounting server 204 communicate using the RADIUS Accounting protocol. Table 1 represents a list of RADIUS Accounting attributes that may be included in the packets that are communicated between network access servers 202a–d and accounting server 204, and an attribute number that accounting server 204, in the preferred embodiment, associates with each of the attributes. Storage of RADIUS accounting information may be minimized by storing the associated attribute numbers rather than the attribute names.

TABLE 1

RADIUS ACCOUNTING ATTRIBUTES

| NUMBER | ATTRIBUTE |
| --- | --- |
| 1 | User-Name |
| 2 | User-Password |
| 3 | CHAP-Password |
| 4 | NAS-IP-Address |
| 5 | NAS-Port |
| 6 | Service-Type |
| 7 | Framed-Protocol |
| 8 | Framed-IP-Address |
| 9 | Framed-IP-Netmask |
| 10 | Framed-Routing |
| 11 | Filter-Id |
| 12 | Framed-MTU |
| 13 | Framed-Compression |
| 14 | Login-IP-Host |
| 15 | Login-Service |
| 16 | Login-TCP-Port |
| 18 | Reply-Message |
| 19 | Callback-Number |
| 20 | Callback-Id |
| 22 | Framed-Route |
| 23 | Framed-IPX-Network |
| 24 | State |
| 25 | Class |
| 26 | Vendor-Specific |
| 27 | Session-Timeout |
| 28 | Idle-Timeout |
| 29 | Termination-Action |
| 30 | Called-Station-Id |
| 31 | Calling-Station |
| 32 | NAS-Identifier |
| 33 | Proxy-State |
| 34 | Login-LAT-Service |
| 35 | Login-LAT-Node |
| 36 | Login-LAT-Group |
| 37 | Framed-AppleTalk-Link |
| 38 | Framed-AppleTalk-Network |
| 39 | Framed-AppleTalk-Zone |
| 60 | CHAP-Challenge |
| 61 | NAS-Port-Type |
| 62 | Port-Limit |
| 63 | Login-LAT-Port |

In certain embodiments, network access servers 202a–d associate connection information with the appropriate RADIUS Accounting attributes which are then communicated to accounting server 204. In response to receiving the information, accounting server 204 stores the information in the form of RADIUS accounting data 210.

FIG. 3 illustrates an example of connection information that may be stored by accounting server 204. In this example, RADIUS accounting data 300 contains two connection information records 302 and 304. Each record includes information that describes the state of a particular connection at a particular point in time. In one embodiment, accounting server 204 respectively includes a timestamp value 306 and 308 with each record 302 and 304. The timestamp values indicate when a particular event occurred and may be used to provide a particular ordering for storing the records in RADIUS accounting data 300.

In certain embodiments, accounting server 204 stores the RADIUS accounting data for each network access server 202a–d in a separate file. This enables the archiver 206 to rapidly locate the RADIUS accounting data that is associated with a particular network access server.

GENERATING REPORT ARCHIVE DATA

After RADIUS accounting data 210 is stored, it is retrieved by archiver 206. Archiver 206 then generates report archive data 212 based on the RADIUS accounting data 210. In general, a subset of the RADIUS accounting data 210 may be stored in report archive data 212, because only the information that may be required for generating the report data actually needs be stored. In certain embodiments, a separate directory is created for storing the report archive data that is generated each day.

In a preferred embodiment, archiver 206 periodically retrieves information from RADIUS accounting data 210 and stores it in the form of report archive data 212. By periodically generating report archive data 212, archiver 206 may purge RADIUS accounting data 210 for which archiving has previously been performed, without affecting the ability to generate reports.

In a preferred embodiment, a user can control the RADIUS accounting data 210 that is used to generate report archive data 212. For example, archive configuration control information 214 provides input by archiver 206 for determining the information that is to be stored in report archive data 212. In certain embodiments, a user defines the archive configuration control information 214 by selecting a set of RADIUS accounting attributes that identify RADIUS accounting data 210 that is used for generating report archive data 212. For example, the archive configuration control information 214 may include a list of the accounting attributes and their associated values as previously illustrated in Table 1. Preferably, in archive configuration control information 214 a semi-colon is included before each accounting attribute for which report data will not be generated. This enables archiver 206 to identify the RADIUS accounting data that should be stored as report archive data 212.

Several methods may allow users to define the archive configuration control information 214. For example, the archive configuration control information 214 may be in a file that is read by archiver 206. By modifying the file, a user can control the type of RADIUS accounting data that is stored in report archive data 212. Alternatively, a user may use a graphical user interface to manipulate archive configuration control information 214 so as to control the RADIUS accounting data that is stored by archiver 206 in report archive data 212.

In one embodiment, the archive configuration control information 214 includes a list of one or more RADIUS Accounting attributes which are used by archiver 206 to select the RADIUS accounting data 210 is to be stored as report archive data 212. In certain embodiments, the selected RADIUS accounting data 210 is reformatted and may be compressed before being stored as report archive data 212.

GENERATING REPORT DATA

Report generator 208 is configured for generating user-specified reports. For example, users may specify that reports are to be generated on an hourly basis, a daily basis, a weekly basis or a monthly basis. In one embodiment, report generator 208 uses report configuration control information 216 to dynamically determine the report type and the particular format of the report that is to be generated. Thus, by updating the report configuration control information 216, a user may control the type of report that is to be generated, and the particular sampling intervals and data categories that are to be used in generating the report data.

Figure 4:
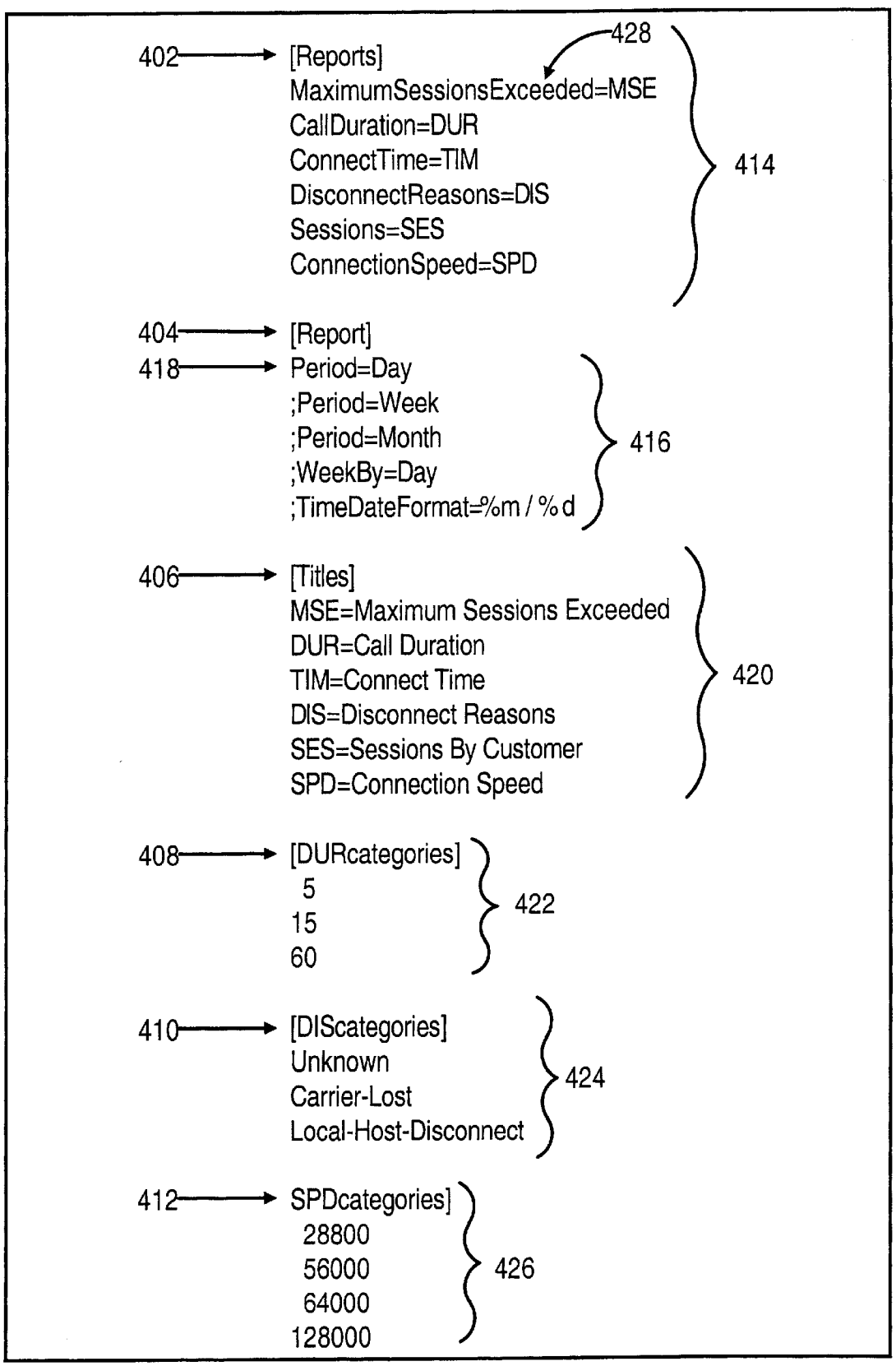
FIG. 4 illustrates report configuration control information that may be used as input to a report generator for defining a user-specified report.

FIG. 4 illustrates one embodiment of report configuration control information 216 that includes a report key 402, a report parameter key 404, a title key 406, a duration categories key 408, a disconnect categories key 410 and a speed categories key 412. Report key 402 identifies the start of information comprising a report section 414. Report section 414 specifies the type of reports that are to be generated, and one or more abbreviations used generate a name for a report file that contains the report. In certain embodiments, the date and possibly the time that the report is generated may be appended to the abbreviation so as to create a unique report file name. For example, a "ConnectionTime" report, which is printed daily, may have a report file name of "TIM19980704.csv". Examples of user-specified reports are illustrated and described below.

Report parameters key 404 identifies an interval section 416 of report configuration control information 216. Interval section 416 specifies a time interval for which reports are to be generated, and a format that is to be used to indicate when the report was generated. Preferably, interval section 416 includes a plurality of available report generation time intervals ("Period=Day", "Period=Week", etc.) that are stored in disabled form by commenting them out using a semicolon symbol. In the example of FIG. 4, a report generation time interval of "Day" has been selected by removing the semi-colon in front of time interval 418.

Title key 406 identifies a title section 420 that defines a title for each report. An abbreviation associates a title with a report. For example, the abbreviation "DIS" associates the title "Disconnect Reasons" with report type "Disconnection-Reasons" which is defined in report section 414.

One or more category keys with associated category sections may be placed in report configuration control information 216 to define categories of information for a particular report. The particular category keys and category sections vary depending on what information the user desires to present in a report. By way of example, FIG. 4 shows a duration category section 422, disconnect category section 424, and speed category section 426. The name of each category key has a prefix that is associated with and matches one of the abbreviations that are defined in report section 414. For example, duration categories key 408 ("DURcategories") includes a prefix "DUR" that matches the "DUR" abbreviation set forth in report section 414.

Duration categories key 408 identifies a duration category section 422 of report configuration control information 216. Duration category section 422 defines the duration categories that are to be used for reporting the connection information. In the example of FIG. 4, the values of duration category section 422 define duration categories "0 . . . 5"; "5 . . . 15"; "15 . . . 60"; and ">60."

Disconnect categories key 410 identifies a disconnection category section 424 that identifies a set of disconnect reasons that are to reported.

Speed categories key 412 identifies a speed category section 426 that defines a set of connection speed categories that are to be used for reporting the connection information. In the example of FIG. 4, the values of speed category section 426 define connection speed categories "28800"; "56000"; "64000"; and "128000" will be used.

In a preferred embodiment, report generator 208 uses classes of an object-oriented programming language to generate report data. The classes may dynamically generate reports that are based the different RADIUS accounting attributes. In one embodiment, the report generator 208 includes an "accumulate" class that is used to accumulate the values that are associated with an accounting attribute, a "countnumber" class that is used to count the number of times a number value is associated with an attribute, and a class "stringclass" that is used to count the number of times a string value is associated with an attribute.

To enable report generator 208 to dynamically generate a report using these classes, report configuration control information 216 contains a section that specifies parameters for the report data. The parameter section is stored in a form similar to the categories sections 422, 424 and 426 of FIG. 4, except that the keyword "parameters" follows the report's abbreviation. In addition, within the section, the keyword "attribute" indicates the accounting attribute that is to be used for generating the report data.

For example, to produce a report that indicates the number of times a particular network access server port is used, a user may define the following report configuration control information:

[Reports]
    CountNumber=Port
[PORTparameters]
    attribute=5
[PORTcategories]
    0
    1
    2

In this example, a report of type "CountNumber" is defined and is associated with an abbreviation of "Port". Report type CountNumber indicates that a "countnumber" class is to be instantiated and used to count the number of times the accounting attribute "5" (NAS-PORT) is associated with either the value "0", "1" or "2". When no time interval is indicated, a default time interval of one "Day" is used.

As another example, to produce a connect time report, a user may define the following report configuration control information:

[Reports]
    Accumulate=TIMS
[TIMSparameters]
    attribute=46
    factors=1

In this example, a report of type "Accumulate" is to be generated and is associated with an abbreviation of "TIMS". Report type Accumulate indicates that a accumulate class is to be instantiated and used to accumulate or sum-up the time values that are associated with the accounting attribute "46" (Acct-Session-Time). In this example, by including the statement "factor=1", the connection time will be reported in seconds instead of minutes, which is the default. Alternatively, a statement such as "factor=3600" could have been used to report the connection time in hours.

According to another embodiment, report configuration control information 216 may have the form set forth below:

```
[ReportParamters]
Directory=directoryName
Frequency=HOURLY|DAILY|WEEKLY|MONTHLY
```

| [Reports]      |                              |
|----------------|------------------------------|
| M              | MSE 'Maximum Sessions Exceeded' |
| S              | SBC 'Sessions by Customer'   |
| T 5, 15, 60    | DUR 'Call Duration'          |
| T              | TIM 'Connect Time'           |
| D =2, =11, =20 | DIS 'Disconnect Reason'      |
| R 2800, 5600, 9600 | SPD 'Data Rate'          |

```
[ReportTIM]
    TimeFormat={H|M}
[ReportDIS]
    2=Unknown
    11=Carrier Lost
    20=Local Host Disconnect
```

The Frequency parameter specifies the frequency of the report. Report generator 208 may be invoked using a scheduling mechanism, and therefore may not know the frequency; this parameter specifies it. The report generator 208 could be invoked by the scheduling mechanism multiple times: daily, weekly, and/or monthly. In that case, the scheduling mechanism may invoke report generator 208 using multiple different configuration file parameters. In an alternate embodiment, the frequency parameter may specify more narrowly when the interval begins, for example, a number of days before today, or a specific day. The frequency parameter may be "Hourly" only for the Max Sessions Exceeded Report.

The lines in the [Reports] section above provide examples of how the user may specify reports. The first field identifies the report. The following numeric fields, if they are present, specify the various data ranges ("buckets") for accumulation, the next field specifies an abbreviation for the report to be used in the report file name, and the last field is the report title.

If integers follow the report identifier, the values of the attribute for that report are to be subcategorized into the buckets. If none follow, then the values of the attribute are to be counted or summed. If the integers are preceded by an equals sign (=), then occurrences of a discrete value are to be counted, rather than being counted in a range of values.

The single characters shown in the first field of the [Reports] section are used for simplification. Some translate into a count report for an attribute: The Acct-Session-Time attribute (46) for the Call Duration Report, the Acct-Terminate-Cause attribute (195) for the Disconnect Reason Report, and the Acct-Data-Rate attribute (197) for the Data Rate Report, and a pseudo-attribute for Max Sessions Exceeded Report. The Connect Time Report is an accumulation report for the Acct-Session-Time attribute (46). The Sessions-By-Customer Report is unique.

NON-RADIUS ACCOUNTING INFORMATION

In certain embodiments, non-RADIUS accounting information may also be included in the user-specified reports. In a preferred embodiment, report data 218 may include additional connection information that is not normally supported by the RADIUS protocol. For example, report data 218 may include the number of times the maximum number of sessions have been exceeded for a particular entity. In this context, "entity" includes both single users and groups of users. For example, an entity may be (1) an individual such as "John"; (2) employees of a group of a company, such as the marketing or engineering group; or (3) all employees or groups of individuals that make up a company or organization.

Maximum session counts, and other connection information that is not generally supported by the RADIUS protocol, is described in U.S. patent application Ser. No. 09/231,926, entitled "Distributed Volatile Cache Policy", filed on Jan. 14, 1999, the contents of which is incorporated herein by reference in its entirety.

Figure 5:
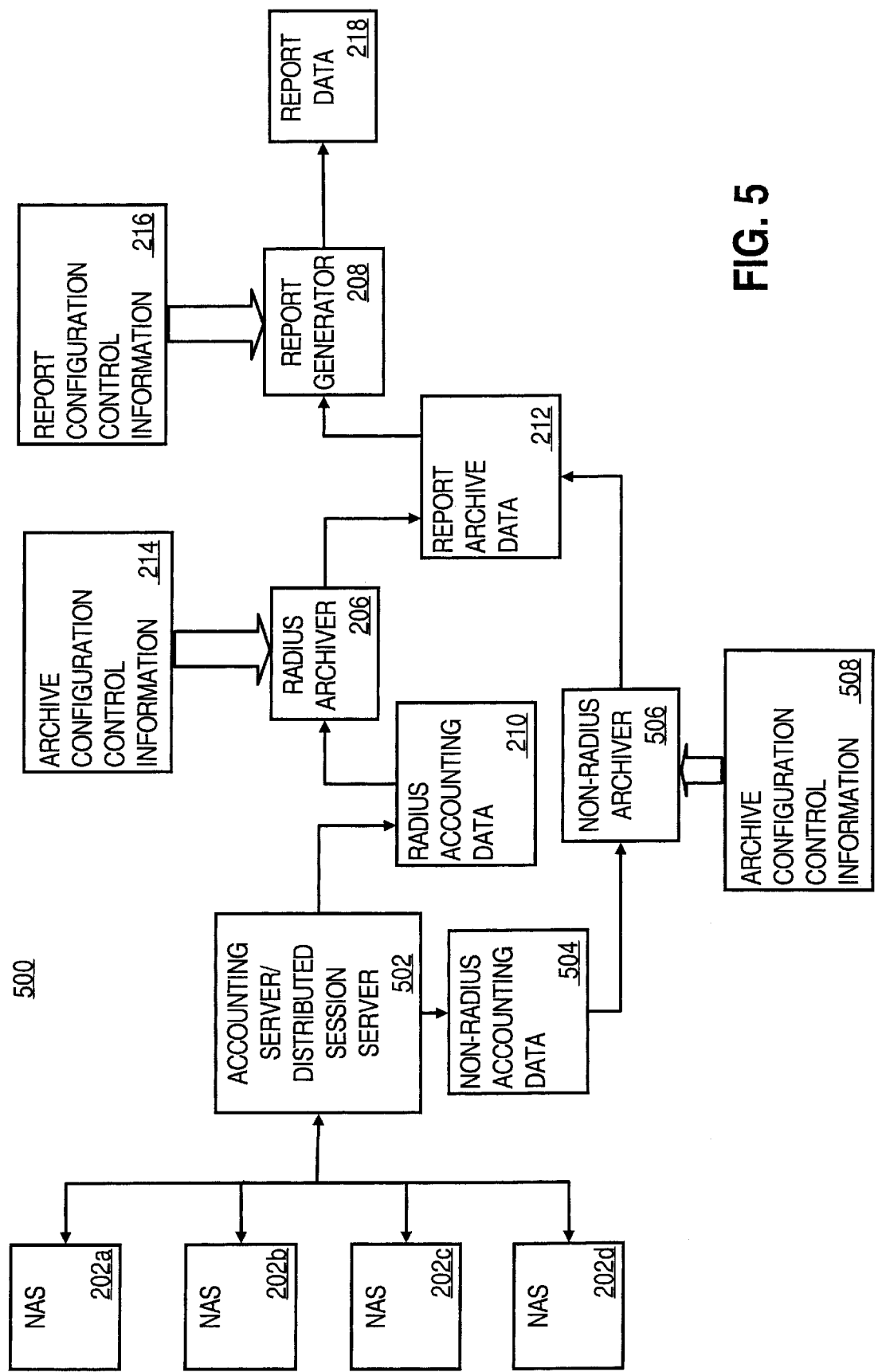
FIG. 5 is a block diagram of a system in which embodiments can be used.

FIG. 5 is a block diagram of a system 500 in which embodiments of the invention can be used. FIG. 5 is similar to FIG. 2 and like numbered components perform similar functions and are structured in similar ways. Generally, the system 500 includes an accounting/distributed session server 502 that is capable of processing both RADIUS accounting information and Non-RADIUS accounting information. In a preferred embodiment, in communicating with network access servers 202a–d, accounting/distributed session server 502 stores distributed session information in the form of Non-RADIUS accounting data 504. The distributed session information may include such information as the maximum number of sessions that are authorized for a particular entity and the number of times the maximum number of sessions has been exceeded for the entity.

Non-RADIUS archiver 506 functions in a similar manner as archiver 206 to periodically pull information out of Non-RADIUS accounting data 504 and then store it in the form of report archive data 212. Like archiver 206, Non-RADIUS archiver 506 uses archive configuration control information 508 to determine the type of Non-RADIUS accounting data 504 that is to be stored in report archive data 212. In a preferred embodiment, Non-RADIUS archiver 506 causes the selected Non-RADIUS accounting data 504 to be stored in chronological order in report archive data 212.

In this example, report generator 208 is configured for generating user-specified reports that may include not only RADIUS accounting data 210 but also Non-RADIUS accounting data 504. For example, a user may specify that report data 218 indicates the maximum number of sessions that were exceeded for a particular entity during a certain period of time. Examples of such periods of time include on an hourly basis, a daily basis, a weekly basis or a monthly basis.

EXAMPLES OF USER-SPECIFIED REPORT

FIG. 6A, FIG. 6B, FIG. 6C, FIG. 6D and FIG. 6E depict examples of a subset of the user-specified reports that can be generated according to embodiments of the invention.

FIG. 6A depicts an example of a maximum sessions exceeded report 600 that includes a count of the number of times the maximum-sessions limit (number of authorized sessions) for a particular entity has been exceeded for each data sample interval.

Maximum sessions exceeded report 600 includes a user-specified data sample interval column 602 and maximum sessions exceeded column 604. The row values of column 604 indicate the number of times a particular entity has exceeded its authorized session count. In this example, as indicated by the row values of column 602, the report shows the maximum sessions exceeded information reported using daily sample intervals, with hourly increments. However, as previously indicated, other time sample intervals may be selected for use for displaying the information in a particular report. For example, a user may choose to represent the information in a maximum sessions exceeded report using such data sample intervals as:

hourly sample intervals, with 12 five-minute increments;

daily sample intervals, with 24 hourly increments;

weekly sample intervals, with 168 hourly increments or 7 daily increments; or monthly sample intervals, with 30 daily increments.

Thus, embodiments of the invention are not limited to any particular time interval for generating reports.

This report, and all others described herein, obtains information for rows and columns from the report archive data 212 based on values for RADIUS attribute 1 (User-Name) that are stored in the report archive data 212. Selected reports obtain information based on other RADIUS attributes, as noted below.

Figure 6B:
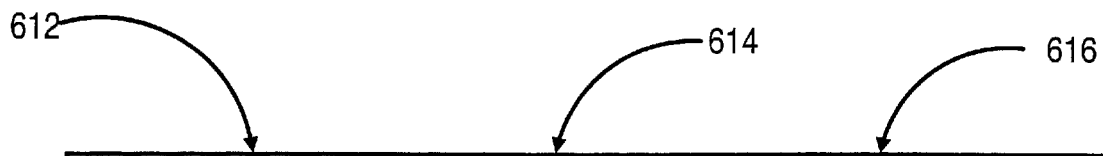
FIG. 6B depicts another example of a user-specified report.

FIG. 6B depicts an example of a number of sessions by entity report 610 that includes a user-specified data sample interval column 612, a maximum simultaneous sessions column 614 and a sessions column 616. The row entries in column 612 are used to present the connection information in user-specified intervals; hourly data sample intervals are used in this example. The row entries in column 614 depict the number of sessions that were authorized for the particular entity and the row entries in column 616 depict the number of sessions that were active for the particular entity during each data sample interval. These values are obtained, respectively, from values for RADIUS attributes 40 and 44 (Acct-Status-Type=Start|Stop and Acct-Session-Id) in report archive data 212.

Although data sample interval column 612 is depicted as having daily sample intervals, with hourly increments, other time sample intervals may be selected for use for displaying the information in a particular report. For example, a number of sessions by entity report may use such data sample intervals as:

hourly sample intervals, with 12 five-minute increments;

weekly sample intervals, with 168 hourly increments; or monthly sample intervals, with thirty daily increments.

FIG. 6C depicts an example of a call duration report 620 that includes a user-specified data sample interval column 622 and a plurality of user-specified duration data sample columns 624–630. The row entries in data sample interval column 622 are used to present the connection information in user-specified intervals. Hourly data sample intervals are used in this example. The hourly intervals are determined based on the report configuration control information 216, Reports section 414, Period parameter 41, by selecting "Period=Day". Each interval represents an hour of a day in which one or more calls were initiated. The row entries in duration data sample columns 624–630 depict, for each time data sample interval, a count of the number of calls (sessions) that fall within each call sample interval for the particular entity. The count is created and stored by report generator 208 based on values for RADIUS attribute 46 (Acct-Session-Time) stored in report archive data 212.

The time periods represented by duration data sample columns 624–630 are constructed by report generator 208, when the report is generated, based on report configuration control information 216. Compare FIG. 4 to FIG. 6C. The Duration category section 422 of information 216 in FIG. 4 defines the time periods that are used for columns 624–630. Based on the values "5", "15", "60", report generator 208 automatically determines that it needs to store and display report archive data 212 in four columns. The values specified in the category section of information 216 are taken as the bounds of the columns. Although call duration report 620 includes a particular set of duration data sample intervals (0–5, 5–15, 15–60 and >60), specific intervals are shown for explanation purposes. Thus, any particular data sample intervals may be used, because report data is dynamically generated based on the specific needs of each user. For example, call duration report 620 may alternatively contain duration data sample intervals of "0–10", "10–25" and ">25".

In addition, although data sample interval column 622 is depicted as having daily sample intervals, with hourly increments; other time sample intervals may be selected for use for displaying the information in a particular report. For example, the information in a call duration report may use weekly sample intervals, with 168 hourly increments; or monthly sample intervals, with thirty daily increments.

FIG. 6D depicts an example of a connect hours report 640 that includes a user-specified data sample interval column 642 and a user-specified connect time column 644. The row entries in data sample interval column 642 are used to present the connection information in user-specified intervals; hourly data sample intervals in this example. The row entries in connect time column 644 depict an hourly roll-up of an entity's total connection time. Users may choose a variety of formats to represent an entity's total connection time. For example, an entity's total connection time may be represented in units of minutes, hours, days or any other appropriate unit of time. The report values are created and stored by report generator 208 based on values for RADIUS attribute 46 (Acct-Session-Time) stored in report archive data 212.

In addition, although data sample interval column 642 is depicted as having daily sample intervals, with hourly increments, other time sample intervals may be selected for use for displaying the information in a report. For example, the information in a connection hour report may use weekly sample intervals, with 168 hourly increments; or monthly sample intervals, with thirty daily increments.

FIG. 6E depicts an example of a disconnect reason report 650 that includes a user-specified data sample interval column 652 and a plurality of disconnect reason columns 654–660. The row entries in data sample interval column 652 are used to present the connection information in user-specified intervals. Hourly data sample intervals are used in this example. The plurality of disconnect reason columns 654–660 depict different reasons that a connection may have been disconnected. Values for columns 654–660 are created and stored by report generator 208 based on values for RADIUS attribute 195 (Terminate-Cause or Disconnect-Cause) stored in report archive data 212. Although disconnect reason columns 654–660 includes a specific set of disconnect reasons, they are provided for explanation purposes only. Thus, any particular set of disconnect reason categories may be used.

In addition, although data sample interval column 652 is depicted as having daily sample intervals, with hourly increments, other time sample intervals may be selected for use for displaying the information in a particular report. For example, a disconnect reason report may use weekly sample intervals, with 168 hourly increments; or monthly sample intervals, with thirty daily increments.

FIG. 6F depicts an example of a connection speed report 670 that includes a user-specified data sample interval column 672 and a plurality of connection speed columns 674–680. The row entries in data sample interval column 672 are used to present the connection information in user-specified intervals. Hourly data sample intervals are used in this example. The connection speed columns 674–680 depict different speeds for which connections may have been made. Values for columns 674–680 are created and stored by report generator 208 based on values for RADIUS attribute 197 (Data-Rate) stored in report archive data 212. Although columns 674–680 show specific connection speeds, any connection speed categories may be used.

In addition, although data sample interval column 652 is depicted as having daily sample intervals, with hourly increments, other time sample intervals may be used in a particular report. For example, a user may choose to represent the information in a connection speed report using weekly sample intervals, with 168 hourly increments; or monthly sample intervals, with thirty daily increments.

SEQUENCE FOR GENERATING REPORT DATA
A. OVERVIEW

Figure 7A:
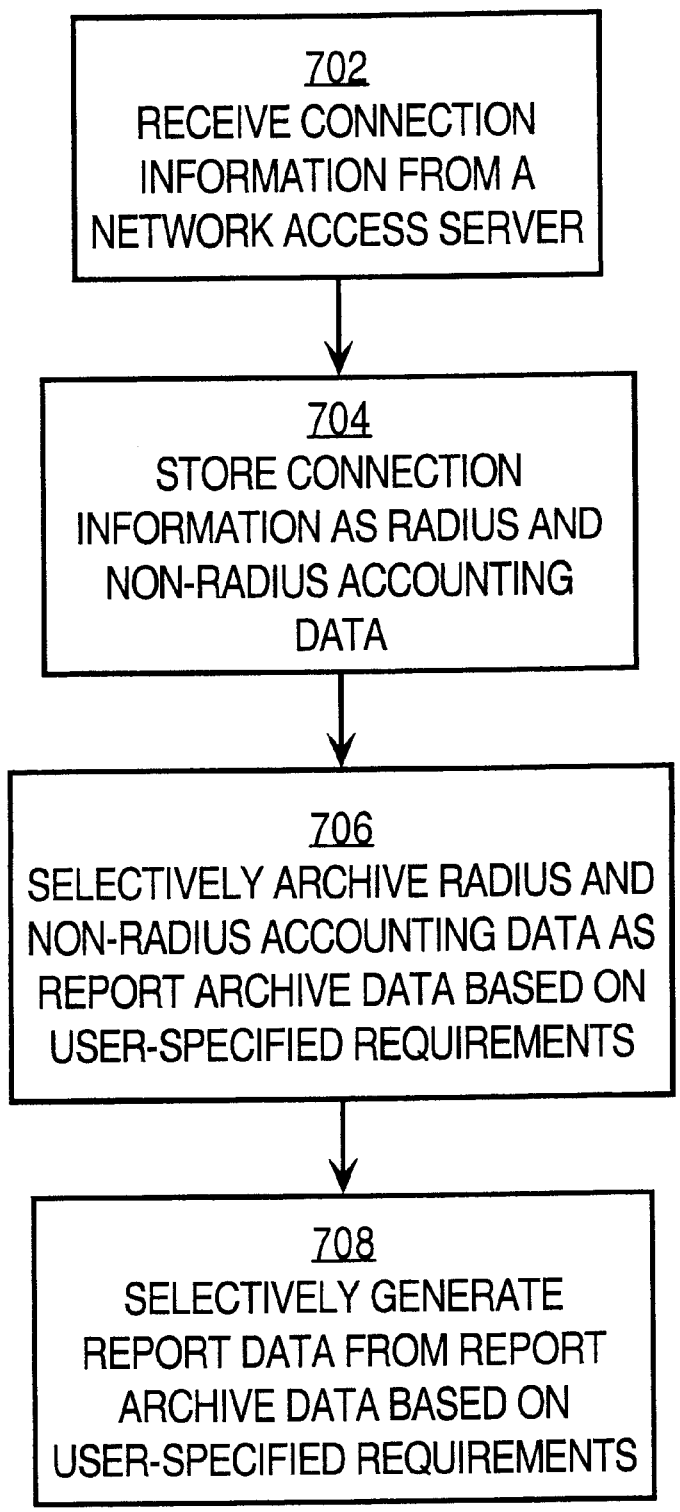
FIG. 7A is a flow diagram that illustrates steps involved in a method for generating user-specified reports.

FIG. 7A is flow diagram that illustrates a method for generating user-specified reports which may be used in the foregoing context. For explanation purposes, FIG. 7A is described in reference to the components of FIG. 5.

At block 702, an accounting server receives connection information from a network access server. The connection information may include RADIUS and Non-RADIUS accounting information that describes or characterizes a particular connection that was established with the network access server. For example, accounting/distributed session server 502 may receive connection information that describes or characterizes a connection that was established with network access server 202a.

At block 704, the accounting server stores the connection information in memory so that it may later be read and processed for generating user-specified reports. In one embodiment, RADIUS and Non-RADIUS accounting information is stored separately by the accounting server. For example, upon receiving connection information network access server 202a, accounting/distributed session server 502 may store RADIUS accounting information in the form of RADIUS accounting data 210 and Non-RADIUS accounting information in the form of Non-RADIUS accounting data 504.

At block 706, report archive data is periodically generated based on the previously stored connection information. In one embodiment, a user may specify the connection information that is used in generating the report archive data. For example, archiver 206 and Non-RADIUS archiver 506 may be respectively configured to periodically read information from RADIUS accounting data 210 and Non-RADIUS accounting information in the form of Non-RADIUS accounting data 504 and store it as report archive data 212. Archive configuration control information 214 may be used by archiver 206 to determine what information in RADIUS accounting data 210 is to be stored as report archive data 212. Likewise, archive configuration control information 508 may be used to by Non-RADIUS archiver 506 to determine what information in Non-RADIUS accounting data 504 is to be stored as report archive data 212.

At block 708, the report archive data is used to generate user-specified reports dynamically based on a set of user-specified requirements. In one embodiment, a report generator is configured to generate report data based on user-specified report configuration control information. Once generated, the report data can be read and formatted to generate to particular report as required by the user.

For example, after report archive data 212 has been generated by archiver 206, report generator 208 reads report archive data 212 and generates report data 218. To generate report data 218, report generator 208 uses report configuration control information 216 to determine the particular information that is to be used in generating report data 218. By allowing users to define the contents of report configuration control information 216, a general-purpose report utility is provided that can dynamically generate user-specified reports.

In certain embodiments, a scheduling mechanism (such as the "cron" program of UNIX) may be used to create report data on a periodic basis. For example, report generator 208 can be scheduled to retrieve information from report archive data 212 on a daily basis and to generate report data 218 based the current report configuration control information 216.

B. REPORT GENERATOR
1. OVERVIEW

Figure 7B:
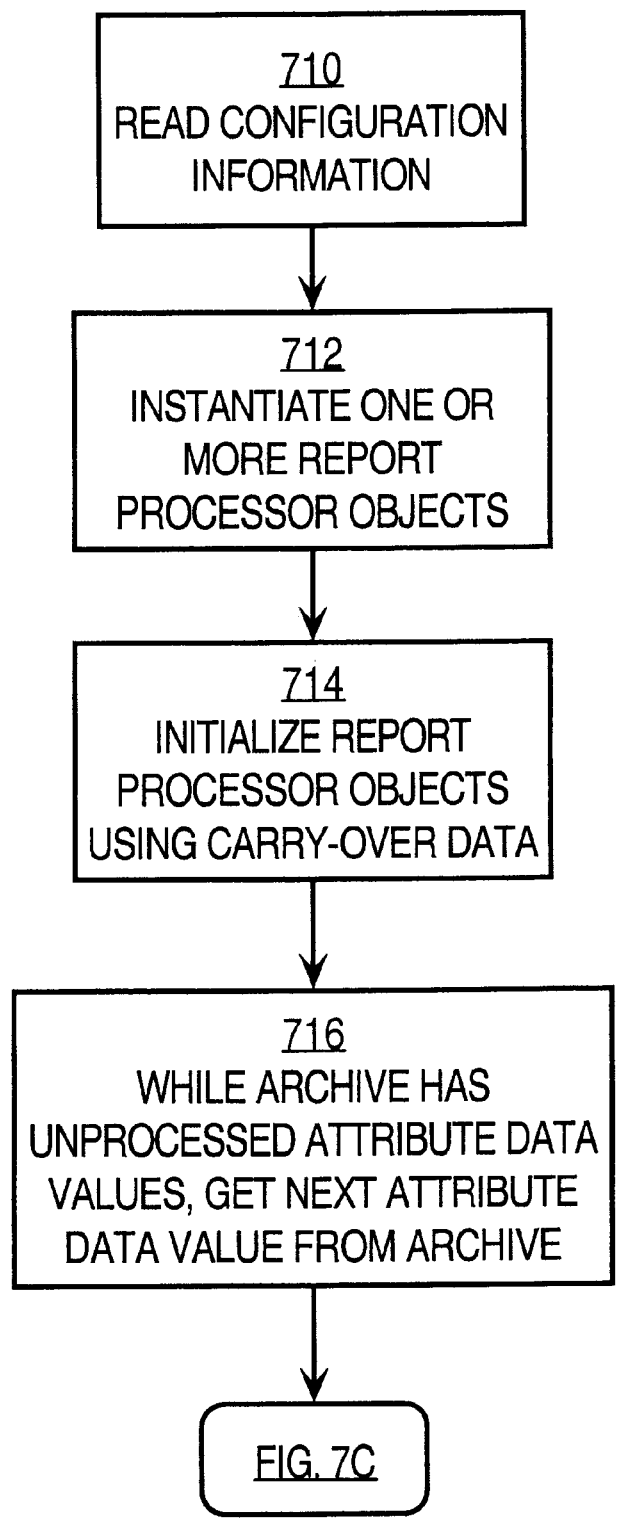
FIG. 7B is a flow diagram that shows further steps in the method of FIG. 7A.
Figure 7C:
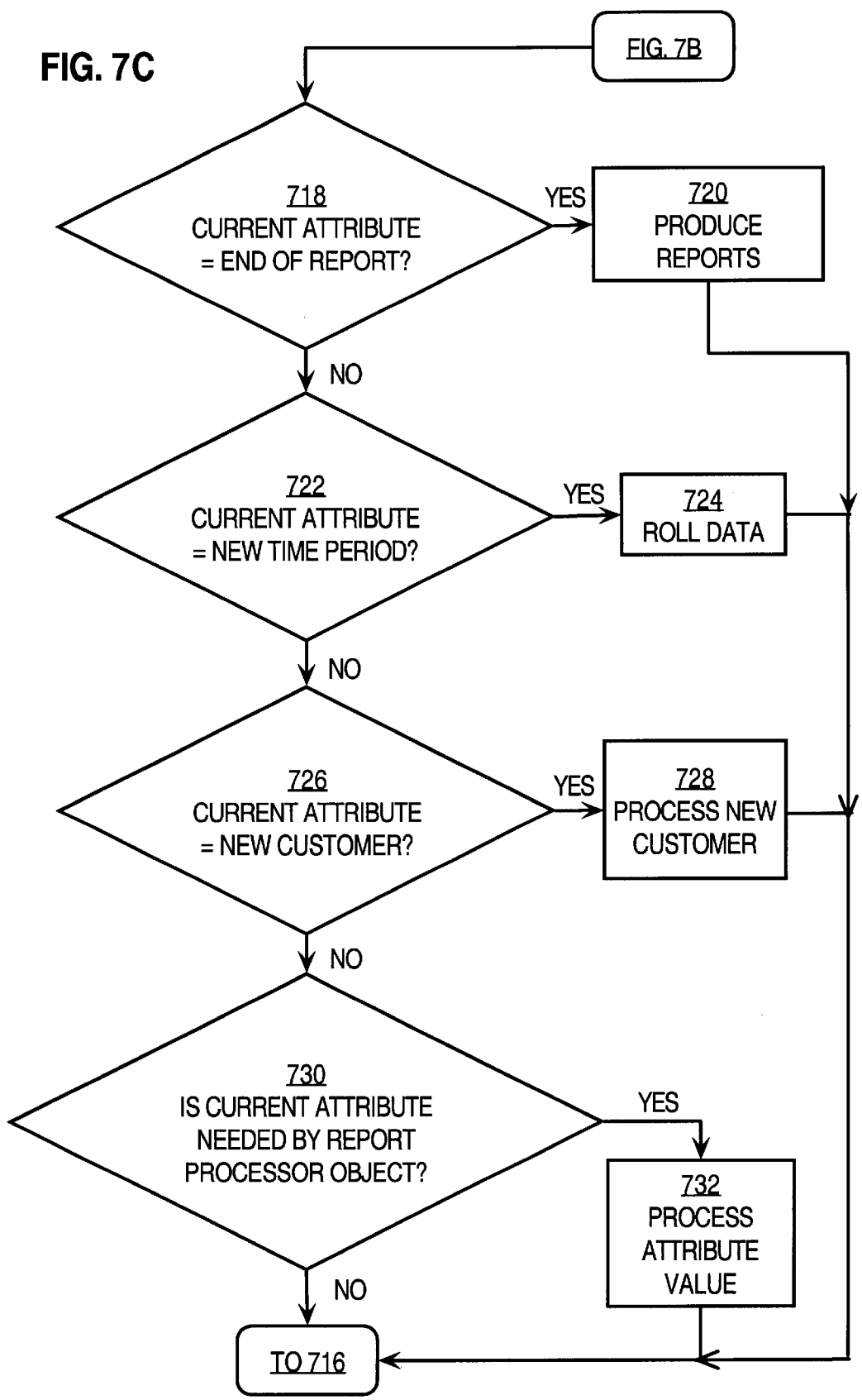
FIG. 7C is a flow diagram that shows further steps in the method of FIG. 7A.

FIG. 7B and FIG. 7C are flow diagrams of a process of generating reports which may implement report generator 208 or block 708 of FIG. 7A. The process is started by the user at the command line or by a time-scheduler program. The process retrieves user-configurable parameters from the report configuration control information 216. The process retrieves archived data from within report archive data 212, and it generates report data 218.

Generally, the process of FIG. 7B and FIG. 7C provides a loop that reads from the archived data, accumulates values of the configured attributes, starts new accumulations at the next time interval, and produces reports, which may use a comma-separated-value file format. In one embodiment, the method instantiates a Report Processing object of one of the generic report types for each configured report. Then it reads each attribute and value in the report archive data 212, and passes that attribute and value to each of the Report Processing objects. Each object processes the data as appropriate for its report, if it needs it.

The report data 218 can be viewed as a matrix and, in one embodiment, can be implemented in one or more stored matrices or database tables. Each time period within the report (e.g. each hour in a daily report) can be viewed as a row in the matrix. Each customer or user can be viewed as a column in the matrix. Data is accumulated in a row within one time period. When a new time period is processed, the row index is incremented and a new accumulation begins. When a new customer or user is encountered, a new column is added.

2. EXTERNAL FUNCTIONS

The method may make use of external methods or functions to access the archive data and configuration information. In the preferred embodiment, external functions enable the method to open the archive data for reading; retrieve one attribute from the archive data; and retrieve one record of data. Other external functions enable the method of open the configuration information, identify the next section of the configuration information, and obtain the next value within the current section in the configuration information.

In an alternate embodiment, there is an external function for organizing and naming report files that contain completed reports. The function stores the report files in a separate directory for each customer, and creates a file name that is unique for the report, frequency, and date or time. The function may use a canonical naming format. For example, the file name for a report other than the Maximum-Sessions-Exceeded hourly report will have the following format: <report-abbreviation><freqency><date>.

The following name is an example: SBCD19980730.CSV. "SBC" is an abbreviation for the Sessions-By-Customer Report, "D" indicates a daily report, "19980730" is the date the report was produced. A sequence number may be generated or incremented if a file by that name already exists and appended to the name.

The file name for the Maximum-Sessions-Exceeded hourly report may have the following format: <report-abbreviation><freqency><date><time >

The following name is an example: MSEH199807301500.CSV. "MSE" is an abbreviation for the Maximum-Sessions-Exceeded Report, "H" indicates an hourly report, "199807301500" is the date and time the report was produced. A file having the same name will be overwritten.

3. DATA STRUCTURES

Attribute Data—Attribute data is expected to be returned from the archive as an attribute stream. The attributes for a particular event are identified by an initial pseudo attribute for date and time, followed by a variable-length list of attributes, terminated by another date and time attribute or the end of the stream. Attributes may be provided in key-value pairs.

The minimum set of RADIUS Accounting attributes for a RADIUS Accounting record comprise of a date and time pseudo attribute, followed by a User-Name attribute (attribute 1), followed by a Acct-Status-Type attribute (40), followed by a Acct-Session-Id attribute (44). Maximum-Sessions Exceeded data is stored in the Archive using a date and time pseudo attribute, followed by a User-Name attribute, followed by a Maximum-Sessions pseudo attribute.

Carry Data—Carry data is the data that "carries over" from one day to the next. For the reports described herein, only the Sessions-By-Customer report has Carry data. This data is kept so that the maximum number of simultaneous sessions per customer can be determined for the case in which a session starts on one day and stops on the next. The archiver calls a method to track the Carry attributes. When archive data is written for a new day, the archiver calls a method to write the Carry data to the archive. After the report generator opens the archive for a report, it calls the archiver to get the Carry data for initializing its accumulators.

Preferably, a Carry data class has a method that tracks the number of simultaneous sessions per customer and that writes the carry data to a file.

4. SPECIFIC IMPLEMENTATION

Referring now to FIG. 7B, in block 710, the process reads a configuration file. Block 710 may involve report generator 208 reading report configuration control information 216. In block 712, for each report specified in the configuration file, the process instantiates a ReportProcessor object. The process then initializes each ReportProcessor object using the carry-over data, which is obtained from an archive, as shown in block 714.

The method then processes a stream of attribute data, which is obtained from the archive, as shown by the processing loop that begins at block 716. Processing attribute data may involve reading attribute values from the archive, accumulating or counting values according to the report definition in the configuration file, and storing the values in one or more temporary variables. The processing may also involve reading the next attribute value ("current attribute") from the archive and processing it as set forth in blocks 718–732.

Referring now to FIG. 7C, if the current attribute indicates that the end of the current report has been reached, as indicated by block 718, then control is passed to block 720 in which a report is produced for each for each ReportProcessor object that has been instantiated.

If the current attribute represents a new time period, as shown by block 722, then control is passed to block 724. In block 724, data for the current time period is stored in a temporary storage and the associated temporary variables are cleared for use in connection with another time period. This is called "rolling the data." Preferably, block 724 also handles the case in which multiple time periods have passed since the last time the data was rolled.

If the current attribute represents a new customer, as shown by block 726, then control is passed to block 728. Block 726 may involve identifying a value for the User-Name RADIUS attribute that is different than a previous value for the same attribute. Block 728 may involve setting a temporary value currentCustomer equal to the current attribute value, and then calling a NewCustomer method and passing it the currentCustomer value. The NewCustomer method creates a new column in the matrix of customer data described above and creates rows containing zero data from the starting time period up to the time period currently being processed.

If the tests of block 718, block 722, and block 726 are negative, then control reaches block 730. In block 730, the process determines, for each ReportProcessor object, whether the current attribute value is needed by that object. If so, then the attribute is processed, as shown by block 732. A ReportProcessor object needs an attribute value if that attribute value is used to compile the information presented in the report. For example, as noted above, the number of sessions by entity report 610 uses values for RADIUS attributes 40 and 44 (Acct-Status-Type=Start|Stop and Acct-Session-Id) in report archive data 212. Thus, report 610 needs values for attribute 40 and attribute 44. The specific functions carried out by the ProcessAttribute method vary according to the type of the report that is generated. For example, if the report type is CountNumber, then the appropriate data range is incremented. If the report type is CountString, then the appropriate string category is incremented. If the report type is Accumulate, then the value of the current attribute is added to the current sum.

Preferably, the process is implemented using one or more software elements that have a command line interface. One possible format of the command line is: CSGenRpt [−c] <configuration_file> where the 'c' parameter, if present, denotes that error messages are to be displayed to the system error device; otherwise, they are displayed to an error log. In the preferred embodiment, the 'c' parameter is not used. Alternatively, the process invoked by a scheduling mechanism. The name of the configuration file is a required parameter. This file contains a specification of the kinds of reports to be produced.

Other parameters may be added. For example, there may be a date parameter in the command line. If a date parameter value is present, then the report is generated only for data on or after the specified date. By default, the report starting date is back-dated from the day the report is run.

The process may also generate one or more messages, such as errors or warnings.

Fatal Errors may include:
  Configuration file '%s' does not exist.
  No valid report types in the configuration file.
  Can't open report file '%s'

Warnings may include:
  The following configuration file entry is unrecognized at field %d.
  The '%s' report will not be generated on an hourly basis.

HARDWARE OVERVIEW

Figure 1:
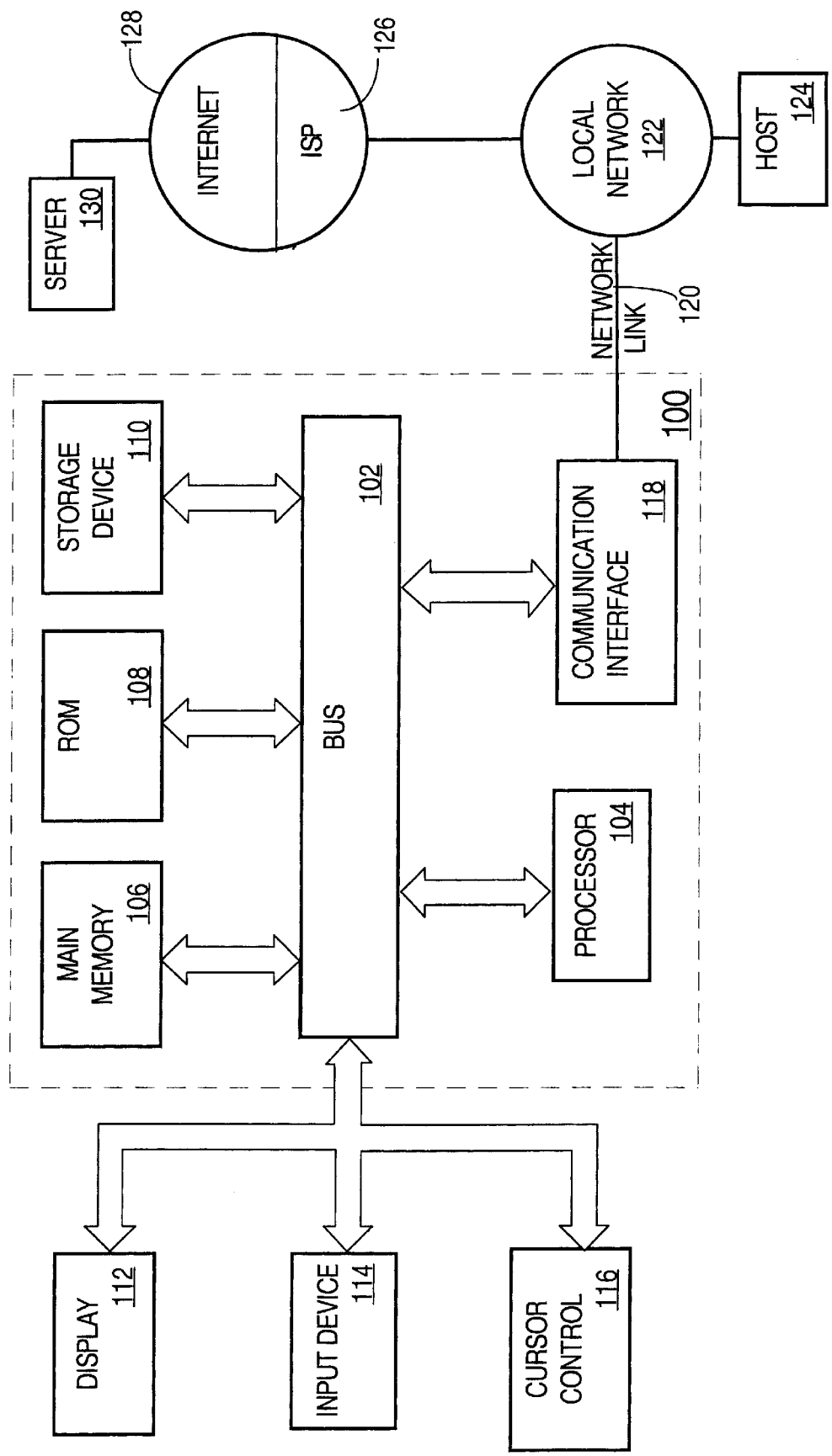
FIG. 1 is a block diagram of a computer system hardware arrangement that can be used to implement aspects of the invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for generating a report that describes performance characteristics of a computer network based on RADIUS accounting information that is produced by the network in operation. According to one embodiment of the invention, a method of generating a report that describes performance characteristics of a computer network based on RADIUS accounting information that is produced by the network in operation is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for generating a report that describes performance characteristics of a computer network based on RADIUS accounting information that is produced by the network in operation as described herein.

The received code may be executed by processor 104 as it is received, and/or stored in storage device 110, or other non-volatile storage for later execution. In this manner, computer system 100 may obtain application code in the form of a carrier wave.

ALTERNATIVES, EXTENSIONS

In the foregoing specification, the invention has been described with reference to specific embodiments thereof. It will, however, be evident that various modifications and changes may be made thereto without departing from the broader spirit and scope of the invention.

For example, although embodiments have been described using the RADIUS Accounting protocol, other proprietary or standardized accounting protocols may be used instead or in addition to the RADIUS Accounting protocol. For example, embodiments may include the generation of user-specified reports based on network systems that use the Terminal Access Controller Access Control System (TACACS) or the Terminal Access Controller Access Control System Plus (TACACS+) protocols to communicate between network access servers and an accounting server. Thus, embodiments are not limited to any particular type of accounting data. As such, the specification and drawings are, accordingly, to be regarded in an illustrative rather than a restrictive sense.

In addition, within this disclosure, including the claims, certain process steps are set forth in a particular order, and alphabetic and alphanumeric labels are used to identify certain steps. Unless specifically stated in the disclosure, embodiments are not limited to any particular order of carrying out such steps. In particular, the labels are used merely for convenient identification of steps, and are not intended to imply, specify or require a particular order of carrying out such steps. For example, in certain embodiments, the accounting/distributed session server 502 may be configured to store RADIUS and Non-RADIUS accounting data directly into report archive data 212. In this manner, the operations of storing the connection information as RADIUS and Non-RADIUS account data (step 704) and of selectively archiving the RADIUS and Non-RADIUS accounting data as report archive data (step 706), may potentially be combined as single step.

What is claimed is:

1. A method of generating a report that describes performance characteristics of a computer network based on RADIUS accounting information that is produced by the network in operation, the method comprising the steps of:

creating and storing archive data comprising a selected portion of the RADIUS accounting information;

creating and storing configuration information that defines the report and comprises a report type identifier that is associated with one or more RADIUS attributes that identify data values in the archive data and that is associated with a generic report type; and one or more attribute values that specify bounds of ranges of the data values;

retrieving and parsing the configuration information to create and store one or more buckets associated with the ranges of the data values for receiving data values falling within such ranges;

reading the archive data and selectively storing its data values in the buckets based on the configuration information; and generating a report by displaying the values that are in the buckets.

2. A method as recited in claim 1, wherein creating and storing configuration information comprises:

creating and storing configuration information that defines the report and comprises a report type identifier that is associated with one or more RADIUS attributes that identify data values in the archive data and that is associated with a generic report type; one or more attribute values that specify bounds of ranges of the data values; and an abbreviation of a name associated with the report;

storing a label, which includes the abbreviation, in a section of the configuration information that identifies the bounds of ranges.

3. A method as recited in claim 1, wherein the step of generating a report comprises the step of generating a report by displaying the values that are in the buckets only when an attribute in the archive data indicates that an end of the report has been reached.

4. A method as recited in claim 1, wherein the step of reading the archive data and selectively storing its data values further includes the step of rolling the data values in the buckets when a new time period is identified in the archive data.

5. A method as recited in claim 1, wherein the step of generating a report further comprises the step of creating and storing report data in the form of a matrix having rows corresponding to time periods and columns corresponding to customers, and wherein the step of reading the archive data and selectively storing its data values further includes the step of, when a new customer is identified in the archive data, creating a new column in the matrix and creating rows containing zero data from the starting time period up to the time period currently being processed.

6. A method as recited in claim 1, wherein the step of reading the archive data and selectively storing its data values in associated buckets only when the data values are needed by the current report and its associated buckets.

7. A method as recited in claim 1, wherein creating and storing configuration information comprises:

creating and storing configuration information that defines a plurality of reports, the configuration information comprising, for each of the plurality of reports:

a report type identifier that is associated with one or more RADIUS attributes that identify data values in the archive data and that is associated with a generic report type;

a time interval value that indicates a period of time to be covered by information in the report; and one or more category values that specify bounds of ranges of the data values.

8. A method as recited in claim 7, wherein creating and storing configuration information comprises:

creating and storing configuration information that defines a plurality of reports, the configuration information comprising, for each of the plurality of reports:

a report type identifier that is associated with one or more RADIUS attributes that identify data values in the archive data and that is associated with a generic report type;

a time interval value that indicates a period of time to be covered by information in the report; and one or more category values that specify bounds of ranges of the data values; and an abbreviation of a name associated with the report;

storing a label, which includes the abbreviation, in a section of the configuration information that identifies the bounds of ranges.

9. A method as recited in claim 7, wherein creating and storing configuration information comprises:

creating and storing configuration information that defines a plurality of reports, the configuration information comprising, for each of the plurality of reports:

a report type identifier that is associated with one or more RADIUS attributes that identify data values in the archive data and that is associated with a generic report type selected from among: a numeric value counting report type; a string value counting report type; and an accumulating report type.

10. A method as recited in claim 1, further comprising the steps of:

receiving and storing non-RADIUS network accounting data;

selectively archiving a portion of the non-RADIUS network accounting data in a non-RADIUS archive;

storing a sub-portion of information from the non-RADIUS archive in the archive data, based on non-RADIUS archive configuration control information.

11. A method as recited in claim 1, wherein generating a report comprises:

generating a maximum-sessions-exceeded report that presents, for a pre-determined time period that is identified in the configuration information, a number of sessions of the clients and the network that exceeded a maximum allowed number of sessions.

12. A method as recited in claim 11, wherein the step of receiving connection information comprises the step of receiving Non-RADIUS accounting information from the network access servers, and wherein the step of generating a report comprises generating the report based, in part, on the Non-RADIUS accounting information.

13. A method as recited in claim 1, wherein generating a report comprises:

generating a number-of-sessions-by-entity report that presents, for a pre-determined time period that is identified in the configuration information, a number of sessions carried out between clients that are associated with a particular entity and the network, and a number of maximum simultaneous sessions allowed for the entity.

14. A method as recited in claim 1, wherein generating a report comprises:

generating a call duration report that presents, for a pre-determined time period that is identified in the configuration information, a plurality of numbers of calls that are carried out in each of a plurality of time ranges for a particular entity.

15. A method as recited in claim 1, wherein generating a report comprises:

generating a connect hours report that presents, for a pre-determined time period that is identified in the configuration information, a cumulative total time that a particular entity is connected to the network.

16. A method as recited in claim 1, wherein generating a report comprises:

generating a disconnect reason report that presents, for a pre-determined time period that is identified in the configuration information, reasons that calls between a particular entity and the network are disconnected, and a count of a number of calls that are disconnected for each of the reasons.

17. A method as recited in claim 1, wherein generating a report comprises:

generating a connection speed report that presents, for a predetermined time period that is identified in the configuration information, a plurality of number of connection speed values that are used in each of a plurality of speed categories.

18. A method as recited in claim 1, wherein generating a report comprises:

generating a count number report that presents, for a pre-determined time period that is identified in the configuration information, a plurality of number values that are counted in each of a plurality of categories.

19. A method as recited in claim 1, wherein generating a report comprises:

generating a count string report that presents, for a pre-determined time period that is identified in the configuration information, a plurality of string values that are counted in each of a plurality of string values.

20. A method as recited in claim 1, wherein generating a report comprises:

generating an accumulate report that presents, for a pre-determined time period that is identified in the configuration information, a sum of a plurality of numeric values.

21. The method recited in claim 1, wherein:

the step of creating and storing archive data is performed using a first computer; and the step of creating and storing configuration information and the step of retrieving and parsing the configuration information are performed using a second computer;

wherein the first computer and the second computer are different computers.

22. A method for dynamically generating a network performance report based on RADIUS network accounting information, the method comprising the steps of:

receiving first connection information that defines one or more connections of clients to the network over a particular period of time and that is stored in RADIUS attribute format;

receiving archive configuration control information that identifies attributes that are associated with data that should be maintained for generating report data;

storing second connection information that represents data values associated with the identified attributes that are found in the first connection information;

receiving report configuration control information that specifies a network performance report type and one or more data classifications for representing the first or second connection information within the network performance report; and dynamically generating the report data based on the specified report type and the data classifications.

23. A method as recited in claim 22, wherein the step of receiving connection information comprises the step of receiving RADIUS accounting information from one or more network access servers that interface the clients to the network.

24. A computer-readable medium carrying one or more sequences of one or more instructions for generating a report that describes performance characteristics of a computer network based on RADIUS accounting information that is produced by the network in operation, the one or more sequences of one or more instructions including instructions which, when executed by one or more processors, cause the one or more processors to perform the steps of:

creating and storing archive data comprising a selected portion of the RADIUS accounting information;

creating and storing configuration information that defines the report and comprises a report type identifier that is associated with one or more RADIUS attributes that identify data values in the archive data and that is associated with a generic report type; and one or more attribute values that specify bounds of ranges of the data values;

retrieving and parsing the configuration information to create and store one or more buckets associated with the ranges of the data values for receiving data values falling within such ranges;

reading the archive data and selectively storing its data values in the buckets based on the configuration information; and generating a report by displaying the values that are in the buckets.

25. A system for generating a report that describes performance characteristics of a computer network based on RADIUS accounting information that is produced by the network in operation, the system comprising:

one or more storage mediums;

one or more processors coupled to the one or more storage mediums; and one or more sets of computer instructions associated with said one or more storage mediums, the one or more sets of computer instructions including computer instructions which when executed by the one or more processors, cause the one or more processors to perform the steps of:

creating and storing archive data comprising a selected portion of the RADIUS accounting information;

creating and storing configuration information that defines the report and comprises a report type identifier that is associated with one or more RADIUS attributes that identify data values in the archive data and that is associated with a generic report type; and one or more attribute values that specify bounds of ranges of the data values;

retrieving and parsing the configuration information to create and store one or more buckets associated with the ranges of the data values for receiving data values falling within such ranges;

reading the archive data and selectively storing its data values in the buckets based on the configuration information; and generating a report by displaying the values that are in the buckets.

* * * * *